United States Patent
Yamasaki et al.

(10) Patent No.: US 11,816,421 B2
(45) Date of Patent: Nov. 14, 2023

(54) SUMMARY CREATION METHOD, SUMMARY CREATION SYSTEM, AND SUMMARY CREATION PROGRAM

(71) Applicant: AIXS, INC., Tokyo (JP)

(72) Inventors: Kunitoshi Yamasaki, Tokyo (JP); Ryuichi Hosoya, Tokyo (JP)

(73) Assignee: AIXS, INC., Tokyo (JP)

( * ) Notice: Subject to any disclaimer, the term of this patent is extended or adjusted under 35 U.S.C. 154(b) by 0 days.

(21) Appl. No.: 17/595,154

(22) PCT Filed: May 17, 2019

(86) PCT No.: PCT/JP2019/019721
§ 371 (c)(1),
(2) Date: Nov. 10, 2021

(87) PCT Pub. No.: WO2020/234929
PCT Pub. Date: Nov. 26, 2020

(65) Prior Publication Data
US 2022/0253593 A1   Aug. 11, 2022

(51) Int. Cl.
*G06F 40/166* (2020.01)

(52) U.S. Cl.
CPC ................... *G06F 40/166* (2020.01)

(58) Field of Classification Search
CPC .................................................. G06F 40/166
See application file for complete search history.

(56) References Cited

U.S. PATENT DOCUMENTS

| | | | |
|---|---|---|---|
| 2011/0295903 A1* | 12/2011 | Chen | G06F 17/30 |
| 2016/0188568 A1* | 6/2016 | Srinivasan | G06F 17/27 |
| 2017/0116189 A1 | 4/2017 | Chigusa et al. | |
| 2020/0279017 A1* | 9/2020 | Norton et al. | G06F 17/27 |

FOREIGN PATENT DOCUMENTS

| | | | | |
|---|---|---|---|---|
| JP | 2-297157 | | 12/1990 | |
| JP | 2005-092443 | | 4/2005 | |
| MY | PI2016701936 | * | 5/2016 | G06F 17/00 |
| WO | 2015/181962 | | 12/2015 | |

OTHER PUBLICATIONS

International Search Report issued International Application No. PCT/JP2019/019721, dated Jul. 30, 2019, 1 page.
Written Opinion issued International Application No. PCT/JP2019/019721, dated Jul. 30, 2019, 4 pages.

* cited by examiner

*Primary Examiner* — James J Debrow
(74) *Attorney, Agent, or Firm* — Hamre, Schumann, Mueller & Larson, P.C.

(57) ABSTRACT

A server 4 executes a sentences decomposition step (S6) of decomposing one sentences into a sentence, a label assigning step (S7) of assigning a label according to content of the decomposed sentence, a summary element extracting step (S8) of extracting a sentence to which a predetermined label is assigned as a summary element, and a summary creation step (S9) of creating a summary based on the summary element.

9 Claims, 5 Drawing Sheets

FIG. 2

LABEL

SENTENCE 1 : POSITIONING OF STUDY — THIS STUDY IS A COHORT STUDY REGARDING THE EFFICACY OF MEDICATION THERAPY FOR ○○ DISEASE.

SENTENCE 2 : BACKGROUND OF STUDY — THE ○○ DISEASE IS AN INCURABLE DISEASE FOR WHICH A DEFINITIVE THERAPY IS NOT KNOWN. HOWEVER, IN RECENT YEARS, PROGRESS IN MEDICATION THERAPY FOR DELAYING THE PROGRESSION OF A DISEASE STATE HAS BEEN REMARKABLE.

SENTENCE 3 : PROBLEM OF PRIOR STUDY — HOWEVER, IT IS KNOWN THAT THE MEDICATION THERAPY IS DIVIDED INTO THOSE WITH AN AFFECTED INDIVIDUAL FOR WHOM IT IS EFFECTIVE AND THOSE WITH AN AFFECTED INDIVIDUAL FOR WHOM IT SHOWS LITTLE EFFICACY.

SENTENCE 4 : PURPOSE OF STUDY — IN VIEW OF THE ABOVE, THIS STUDY FOCUSES ON SEVERAL PHYSICAL AND LIFESTYLE FACTORS OF AFFECTED INDIVIDUALS AND ASSESSES THEIR IMPACT ON EFFICACY OF THE MEDICATION THERAPY BY COHORT ANALYSIS OVER FIVE YEARS.

SENTENCE 5 : METHOD OF STUDY — FIVE SUBJECTS AFFECTED WITH ○○ DISEASE WERE ANALYZED, AND COHORT ANALYSIS WAS PERFORMED ACCORDING TO THE ○○○ METHOD.

SENTENCE 6 : CONTRIBUTION OF STUDY — AS A RESULT OF THE ANALYSIS, THE FOLLOWING TWO FACTORS ARE IDENTIFIED AS FACTORS AFFECTING THE EFFICACY OF THE MEDICATION THERAPY: □ AND △△.

SENTENCE 7 : SIGNIFICANCE OF STUDY — THIS STUDY MAKES IT POSSIBLE TO PREDICT THE EFFECT OF THE MEDICATION THERAPY FOR THE ○○ DISEASE IN ADVANCE FOR EACH PATIENT BY CLARIFYING THESE FACTORS THAT HAVE NOT BEEN KNOWN SO FAR.

SUMMARY CREATION METHOD, SUMMARY CREATION SYSTEM, AND SUMMARY CREATION PROGRAM

TECHNICAL FIELD

The present invention relates to a summary creation method, a summary creation system, and a summary creation program for creating a summary from a sentence.

BACKGROUND ART

Conventionally, in a case of analyzing a large number of documents such as academic papers and documents, a person has read the documents and classified the documents by content or created summaries. The analysis by a person takes time, and, in a case where a plurality of people perform analysis, there is a tendency that the accuracy of classification and summary creation varies depending on the experience and knowledge of the workers.

Further, complicated and highly specialized documents such as an academic paper require a high degree of expertise to understand the content. However, there is a demand that those who do not have such specialized knowledge easily acquire, understand, and utilize latest information.

For example, a cluster analysis method in which morphological analysis is performed on a technical document retrieved by concept search, a weight is added to each word obtained from the morphological analysis, each technical document is vectorized, and technical documents having close vector directions are grouped into one cluster has been proposed (for example, Patent Literature 1).

In Patent Literature 1, by extracting important words for each cluster and displaying several words in descending order of weight, it is possible to grasp the gist of the cluster. Here, as the weight, a larger value is assigned to a word that frequently appears in one cluster, but has a low appearance frequency in other clusters. However, in a case where a frequently appearing word in documents constituting a cluster is extracted in this way, noise increases, and a word indicating the gist of the cluster is not always extracted. Further, in a case where only words are arranged, it is difficult to understand the gist of the cluster unless a person is an expert in the field.

CITATION LIST

Patent Literature

Patent Literature 1: JP 2005-92443 A

SUMMARY OF INVENTION

Technical Problem

An object of the present invention is to provide a summary creation method, a summary creation system, and a summary creation program capable of creating a highly accurate summary from one sentence and allows more efficient understanding of the gist of the sentence. In the present description, "a document" includes "sentences", "sentences" include two or more of "a sentence", and "a sentence" includes two or more of "a word". In the present description, an "abstract" is sentences expressing an outline or a feature of one document arranged in advance at the beginning or the end of the document. In the present description, "summary" is one or more of a sentence extracted from a certain target and expressing an outline or a feature of the target. Here, the target may be sentences, a document, or a cluster.

Solution to Problem

That is, the present invention is a summary creation method for creating a summary from one sentences by a computer, the method including a sentences decomposition step of decomposing sentences into a sentence, a label assigning step of assigning a label according to content of the decomposed sentence, a summary element extracting step of extracting a sentence to which a predetermined label is assigned as a summary element, and a summary creation step of creating a summary based on the summary element.

Advantageous Effects of Invention

According to the present invention, it is possible to create a highly accurate summary from sentences and to allow more efficient understanding of the gist of the sentences.

BRIEF DESCRIPTION OF DRAWINGS

FIG. 2 is an explanatory diagram illustrating a state of decomposition of sentences and label assignment.

DESCRIPTION OF EMBODIMENTS

Hereinafter, an embodiment of the present invention will be described with reference to the drawings.

Figure 1:
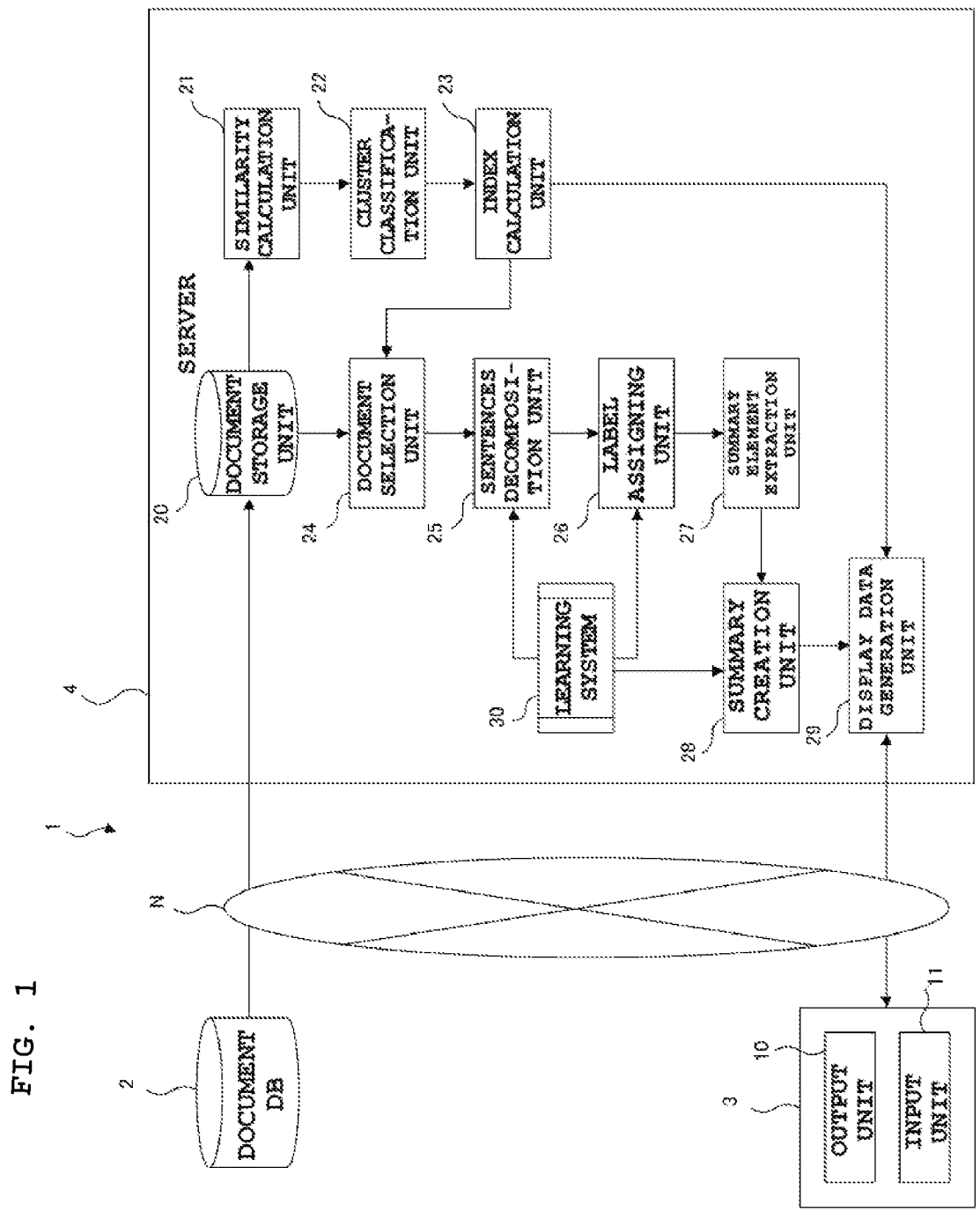
FIG. 1 is an overall configuration diagram of a summary creation system according to an embodiment of the present invention.

FIG. 1 is an overall configuration diagram illustrating a summary creation system according to an embodiment of the present invention. A configuration of the present embodiment will be described with reference to the diagram.

As illustrated in FIG. 1, in a summary creation system 1 according to the present embodiment, a document database 2 (hereinafter, database is referred to as "DB"), an information terminal 3, and a server 4 are connected via a communication network N. The communication network N is, for example, the Internet, an intranet, a virtual private network (VPN), or the like, and is a communication network capable of bidirectionally transmitting information using a wired or wireless communication means. Further, in FIG. 1, one of the document DB 2 and one of the information terminals 3 are connected to one of the servers 4 for simplification of description. However, the server 4 can be connected to a plurality of document DBs and a plurality of the information terminals 3.

The document DB 2 is, for example, a database that stores information of documents such as academic papers, patent documents, journals, books, and newspaper articles, and discloses stored documents to a limited person or non-limited person. In the present embodiment, the document DB 2 will be described as an example of a document DB that stores information of medical literature. However, the content, fields, and types of documents that can be stored in the document DB of the present invention are not limited. In the present embodiment, the information of medical literature includes bibliographic matters such as an author name, a publication year, an affiliation of an author, a content matter of a paper such as a title, a gist, and a text of the paper, citing and cited information such as the number of citing and cited items and citing and cited document names, publication information such as an academic society name, a magazine name, or a publishing company name by which a document is published, and the like.

The information terminal 3 is, for example, a personal computer (hereinafter referred to as "PC"), or a mobile terminal such as a smartphone, a tablet PC, or a mobile phone, and includes an output unit 10 and an input unit 11.

The output unit 10 is, for example, a device such as a display or a printer, and can display the display data generated by the server 4 in a visually recognizable manner.

The input unit 11 is, for example, a device such as a keyboard or a mouse, and allows input and operation of information. The output unit 10 and the input unit 11 may integrally constitute, for example, a touch panel.

A person (user) who uses the information terminal 3 can check the display data generated by the server 4 on the output unit 10 and can issue various instructions to the server 4 via the input unit 12.

The server 4 includes one or more servers (computers) that decompose one or more sentences included in one or more documents to generate a summary (summary sentence). The server 4 includes various calculation units and storage units, and includes, for example, a document storage unit 20, a similarity calculation unit 21, a cluster classification unit 22, an index calculation unit 23, a document selection unit 24, a sentences decomposition unit 25, a label assigning unit 26, a summary element extraction unit 27, a summary creation unit 28, a display data generation unit 29, and a learning system 30.

Specifically, the document storage unit 20 is a storage unit that is connected to the document DB 2 via the communication network N and acquires and stores necessary information of a document from the document DB 2. For example, in the present embodiment, medical literature is acquired from the document DB 2 and stored. Further, the document storage unit 20 has a search function, and can acquire a population of documents to be classified into clusters by extracting a document including a specific keyword from stored documents or extracting a document specified by a date. The document storage unit 20 also has a function of automatically updating a document in the document storage unit 20 in synchronization with updates such as addition or deletion of the document in the document DB 2.

The similarity calculation unit 21 has a function of calculating similarity between content of one document and content of another document for a population of documents stored in the document storage unit 20 or generated documents. For example, TF-IDF or cosine similarity can be used for calculation of the similarity. That is, the similarity calculation unit 21 extracts words used in content of each document, weights each word from a product of an appearance frequency (term frequency (TF)) in a document and rarity (inverse document frequency (IDF)) with respect to a word used in another document, and vectorizes the document. Then, the similarity calculation unit 21 calculates a value of cosine (cos) between vectorized documents as a value of similarity between the documents. The similarity is represented by a value between 0 and 1 in a manner, for example, the similarity between a first document and a second document is 0.856, the similarity between a first document and a third document is 0.732, and, the closer the similarity is to 1, the more similar the documents are.

The cluster classification unit 22 generates a network including the documents connected by a line (hereinafter referred to as "edge") based on the similarity calculated by the similarity calculation unit 21, and classifies similar documents into clusters (document groups). An algorithm for clustering is not particularly limited. For example, an algorithm (what is called the Girvan-Newman algorithm) that specifies a cluster in which connectivity between nodes is maintained as much as possible by iterative calculation even when an edge is separated can be used.

The index calculation unit 23 has a function of calculating a first index indicating the centrality of each document in a network generated by the cluster classification unit 22. An algorithm for calculating the centrality is not particularly limited. For example, eigenvector centrality, PageRank, betweenness centrality, degree centrality, and the like can be used. In the present embodiment, eigenvector centrality is used. The eigenvector centrality for one document (hereinafter referred to as "node") on a network is indicated by a probability of passing through any node in the network when following an edge is repeated starting from the node.

The document selection unit 24 has a function of selecting a document having high centrality in a cluster from the document storage unit 20 using the centrality index calculated by the index calculation unit 23.

The sentences decomposition unit 25 has a function of decomposing sentences of a summary included in the document selected by the document selection unit 24 for each sentence. For example, FIG. 2 explains a case where sentences of a summary are as follows: "This study is a cohort study regarding the efficacy of medication therapy for ○○ disease. The ○○ disease is an incurable disease for which a definitive therapy is not known. However, in recent years, progress in medication therapy for delaying the progression of a disease state has been remarkable. However, it is known that the medication therapy is divided into those with an affected individual for whom it is effective and those with an affective individual for whom it shows little efficacy. In view of the above, this study focuses on several physical and lifestyle factors of affected individuals and assesses their impact on efficacy of the medication therapy by cohort analysis over five years. Five subjects affected with ○○ disease were analyzed, and cohort analysis was performed according to the ○○○ method. As a result of the analysis, the following two factors are identified as factors affecting the efficacy of the medication therapy: □□ and ΔΔ. This study makes it possible to predict the effect of the medication therapy for the ○○ disease in advance for each patient by clarifying these factors that have not been known so far". The sentences decomposition unit 25 decomposes the sentences into units of a sentence such as: "This study is a cohort study regarding the efficacy of medication therapy for ○○ disease", "The ○○ disease is an incurable disease for which a definitive therapy is not known", . . . , "This study makes it possible to predict the effect of the medication therapy for the ○○ disease in advance for each patient by clarifying these factors that have not been known so far". Note that the sentences decomposition unit 25 can decompose sentences into a sentence by the learning system 30 to be described later.

The label assigning unit 26 has a function of assigning a predetermined label to each sentence decomposed by the sentences decomposition unit 25. For example, in the sentences described in FIG. 2, labels of a sentence 1 to a sentence 7 are attached. FIG. 2 illustrates a predetermined label assumed to be assigned to the gist of a research paper, and the sentence 1 to the sentence 7 correspond to the content of "positioning of study", "background of study", "problem of prior study", "purpose of study", "method of study", "contribution of study", and "significance of study". The label assigning unit 26 can assign a label by associating a sentence decomposed by the sentences decomposition unit 25 with each label using the learning system 30 to be described later.

The summary element extraction unit 27 has a function of extracting, as a summary element, a sentence with a specific label among a sentence decomposed by the sentences decomposition unit 25. For example, in the sentence described in FIG. 2, "In view of the above, this study focuses on several physical and lifestyle factors of affected individuals and assesses their impact on efficacy of the medication therapy by cohort analysis over five years" and "This study makes it possible to predict the effect of the medication therapy for the ○○ disease in advance for each patient by clarifying these factors that have not been known so far" which are a sentence to which labels of the sentence 4 and the sentence 7 are assigned are extracted as summary elements. Note that the specific label can be individually set according to a field of a document.

The summary creation unit 28 creates a summary from the summary element extracted by the summary element extraction unit 27. For example, in the document described in FIG. 2, from "In view of the above, this study focuses on several physical and lifestyle factors of affected individuals and assesses their impact on efficacy of the medication therapy by cohort analysis over five years" and "This study makes it possible to predict the effect of the medication therapy for the ○○ disease in advance for each patient by clarifying these factors that have not been known so far" which are summary elements, "assessing impact of factors on efficacy of the medication therapy by cohort analysis makes it possible to predict the effect of the medication therapy for the ○○ disease in advance for each patient" is created as a summary of one sentence. The summary creation unit 28 can create a summary from a summary element using the learning system 30 to be described later.

The display data generation unit 29 has a function of generating, for each document, display data indicating the network by display according to the centrality index, display according to a type of a cluster, and display according to similarity between documents. Further, the display data generation unit 29 has a function of generating data for displaying a summary of a document having high centrality in each cluster. The display data generation unit 29 transmits display data and the like to the information terminal 3 connected via the communication network N.

Figure 3:
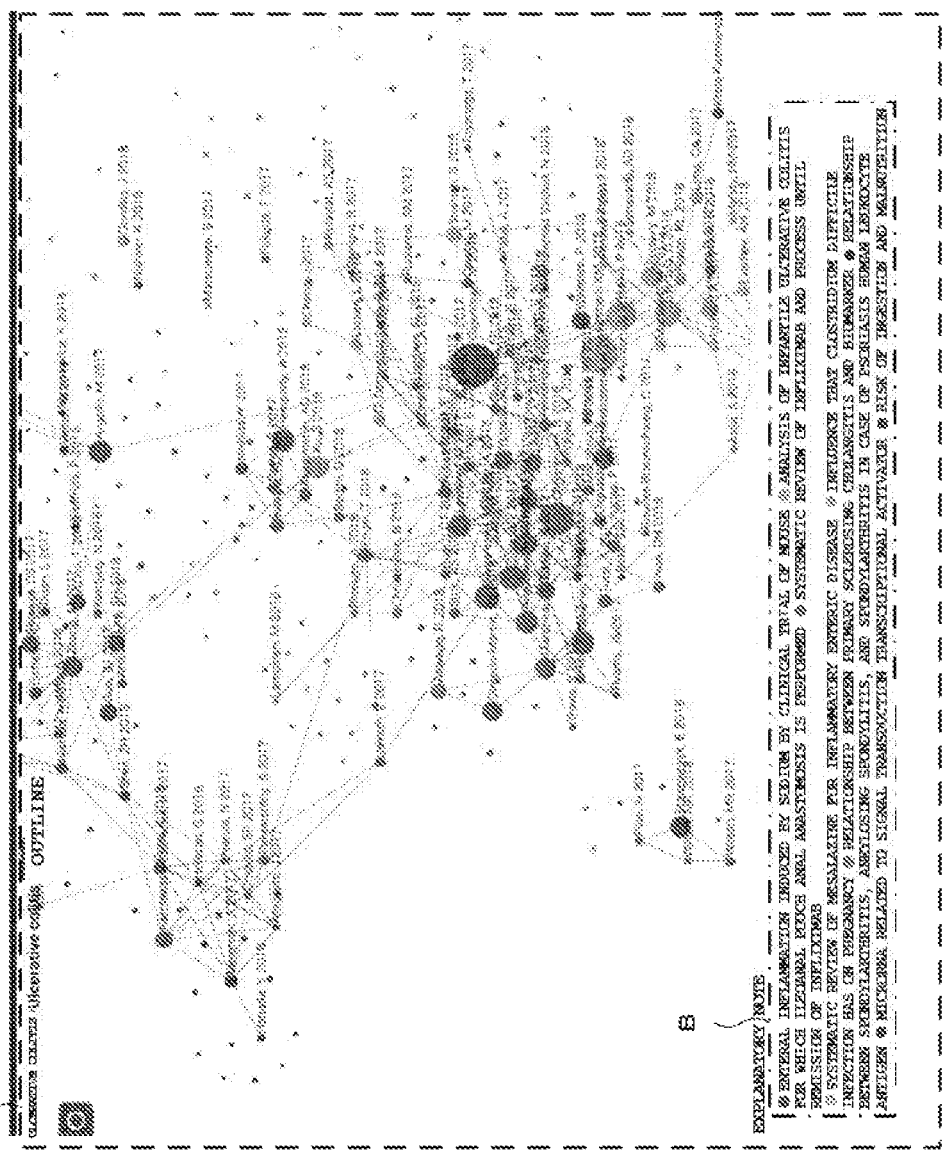
FIG. 3 is a display example of a cluster analysis result and a summary creation result displayed on an output unit of an information terminal.

FIG. 3 is a display example of a cluster analysis result and a summary creation result displayed on the output unit of the information terminal. As illustrated in the diagram, a cluster analysis result is displayed in a range A, and a summary creation result is displayed in a range B.

Figure 4:
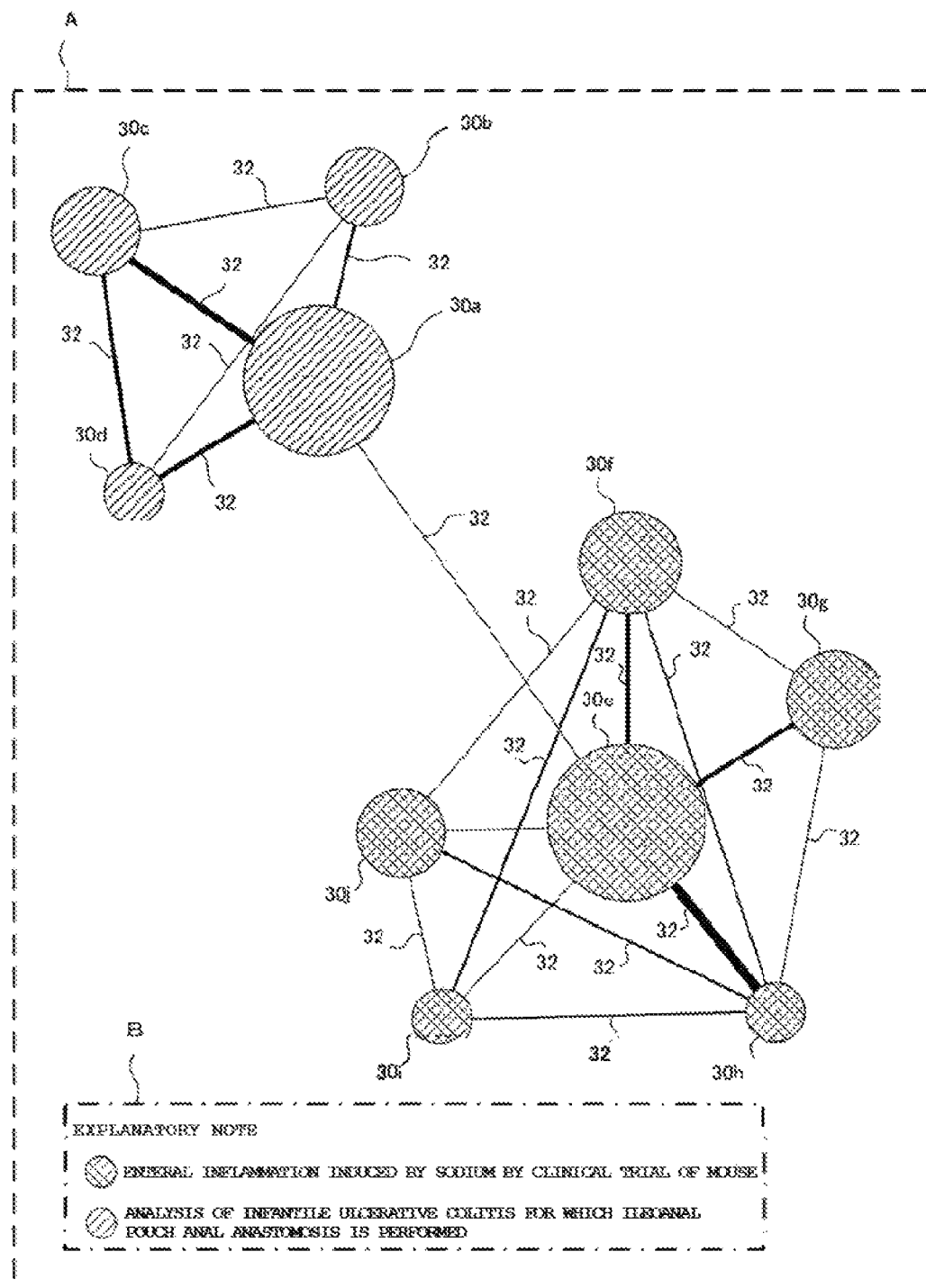
FIG. 4 is a partially enlarged schematic view of the cluster analysis result and the summary creation result illustrated in FIG. 3.

Specifically, as illustrated in FIG. 4, the display data generation unit 29 indicates one document (hereinafter, referred to as "node") on the network by one circle, expresses the centrality index by the size of the circle, expresses a type of a cluster by a color, and expresses the magnitude of the similarity by the thickness of an edge.

In FIG. 4, ten nodes 40*a* to 40*j* (hereinafter also collectively referred to as "nodes 40") are displayed, four of the nodes 40*a* to 40*d* on the upper left belong to a first cluster, and six of the nodes 40*e* to 40*j* on the lower right belong to a second cluster. Note that the first cluster and the second cluster can be represented in different colors. In FIG. 4, a difference in color is indicated by a difference in hatching.

The size of the nodes 40 indicates the degree of the centrality, and in FIG. 4, it can be seen that the node 40*a* and the node 40*e* are documents with high centrality.

Further, the thickness of an edge 41 connecting the nodes 40 indicates the magnitude of the similarity between the documents connected by the edge 41. Therefore, in FIG. 3, since the edges 41 between the node 40*a* and the node 40*c* and between the node 40*e* and the node 40*h* are thick, the similarity between these nodes is shown to be high.

As shown in the range B, a color of each cluster and a summary obtained by further shortening the summary created by the summary creation unit 28 which is a summary of the cluster are displayed as an explanatory note. Note that the summary displayed as the explanatory note may be the summary itself created by the summary creation unit 28.

The learning system 30 has a function of supplying AI that decomposes each document into each item in the sentences decomposition unit 25, AI that assigns a label according to content of a sentence in the label assigning unit 26, and AI that creates a summary sentence on the basis of a summary element in the summary creation unit 28. Specifically, the learning system 30 performs machine learning (for example, deep learning or a neural network) using data in which a document is decomposed into a sentence of each item in advance as learning data (teaching data) to generate AI (learned model) that decomposes a document into items that are constituents of the document. Then, machine learning (for example, deep learning or a neural network) is performed using data for assigning a label according to content of each decomposed sentence as learning data (teaching data), so that AI (learned model) for assigning a label according to content of a decomposed sentence is generated. Furthermore, machine learning (for example, deep learning or a neural network) is performed using a summary sentence using a summary element as learning data in advance, so that AI (learned model) that creates a summary sentence on the basis of a summary element is generated.

Figure 5:
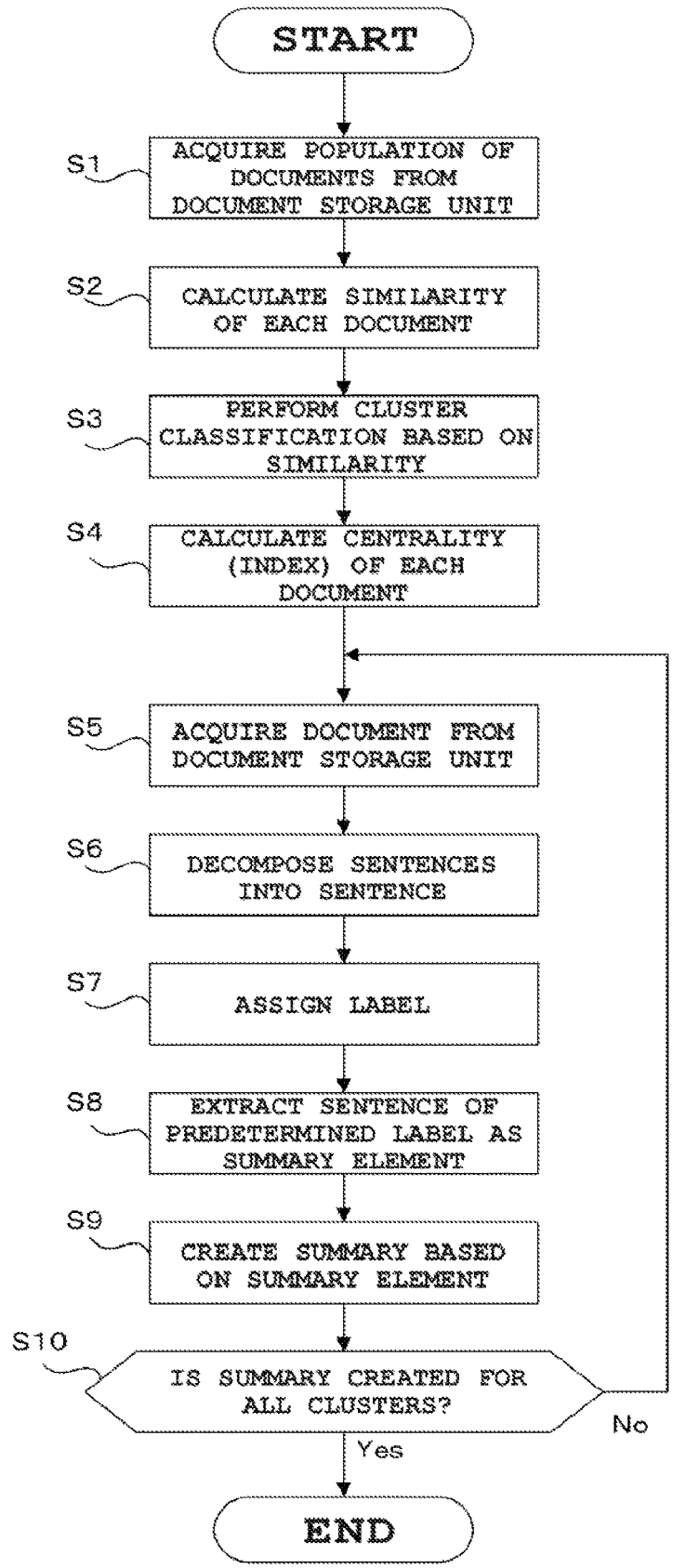
FIG. 5 is a flowchart showing a summary creation control routine executed by a server of a summary creation system according to the embodiment of the present invention.
Figure 4:
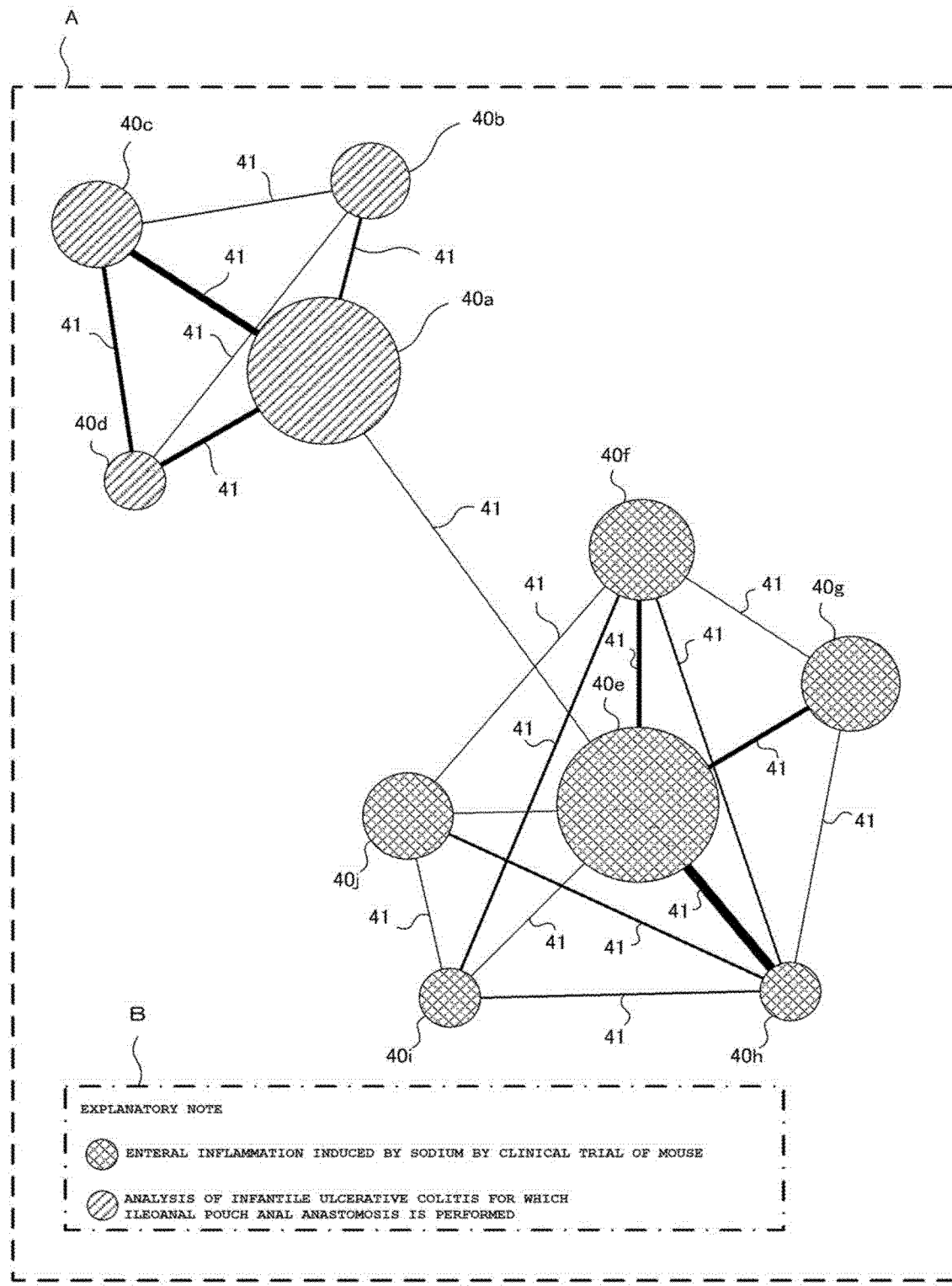

FIG. 5 is a flowchart illustrating a summary creation control routine executed by the server 4 of the summary creation system 1. Hereinafter, the summary creation method of the present embodiment will be described in detail along the flowchart.

Upon receiving input information such as a specific disease name from the information terminal 3, the server 4 acquires a population of documents corresponding to the input information from the document storage unit 20 in Step S1.

In subsequent Step S2, the similarity calculation unit 21 calculates similarity between documents constituting the population.

In Step S3, the cluster classification unit 22 generates a network between documents on the basis of the similarity calculated in Step S2, and performs classification so that a set of similar documents constitute a cluster.

In Step S4, the index calculation unit 23 calculates an index indicating the centrality of the documents in the network generated in Step S3.

In Step S5, the document selection unit 24 acquires a document from the document storage unit 20 based on the index calculated by the index calculation unit 23.

In Step S6, the sentences decomposition unit 25 decomposes sentences included in the acquired document into a sentence.

In Step S7, the label assigning unit 26 assigns a label to each decomposed sentence.

In Step S8, the summary element extraction unit 27 selects a label and extracts a sentence to which the selected label is assigned from a sentence decomposed as a summary element.

In Step S9, the summary creation unit 28 creates a summary on the basis of the extracted summary element.

In Step S10, the server 4 determines whether or not summary creation is finished in all clusters. In a case of determining that the summary creation is not finished (No), the server 4 returns the processing to Step S5. Further, in a case of determining that the summary creation is finished (Yes), the server 4 ends the routine.

As described above, the summary creation system 1 according to the present embodiment can create a highly accurate summary from one sentences by decomposing the sentences into a sentence, assigning a label corresponding to content of the decomposed sentence, extracting a sentence to which a predetermined label is assigned as a summary element, and creating a summary based on the extracted summary element.

Here, the summary creation method of the present invention is compared with another method. As another method, an automatic summary algorithm LexRank will be described as an example. LexRank is an algorithm that decomposes a plurality of sentences included in a set (cluster) of related documents among a plurality of documents into each sentence to generate a set of a sentence, identifies a sentence having high similarity with many of a sentence in the set of a sentence using the above-described TF-IDF and cosine similarity, and extracts the sentence by regarding the sentence as a summary sentence. However, particularly in an academic paper, the entire gist of the paper expresses the outline and feature of the paper, and a specific sentence constituting the gist does not express the outline and feature of the entire paper. For this reason, the creation of a summary by LexRank may lack accuracy as a summary of the cluster.

In contrast, the summary creation method of the present invention forms a network on the basis of similarity of content between documents, classifies the documents into a cluster including similar documents, extracts sentences according to a centrality index indicating centrality from the cluster, and creates a summary from one extracted sentences. For this reason, a summary can be created from the gist of a document having the typicalness and representativeness of the cluster, and the accuracy as a summary of the entire cluster can be improved.

Further, since the label assigning unit 26 functions by using AI for assigning a label, for example, even in a case where the arrangement of a sentence constituting the gist is different depending on the author of a document, an appropriate label can be assigned to an appropriate item.

As described above, according to the present embodiment, it is possible to create a highly accurate summary from one sentences having high centrality in a cluster, so that the user can more efficiently understand the gist of sentences in a cluster.

Although an embodiment of the present invention is specifically described above, it is to be understood that the present invention is not limited to the embodiment, and various changes and modifications in the embodiment can be made by those skilled in the art without departing from the scope or spirit of the present invention as defined in the appended claims.

In the above embodiment, names such as the sentence 1 and the sentence 2 are assigned as labels. However, the expression of the labels is not limited to these. For example, the name may be expressed in a hexadecimal number such as 0x01 and 0x02, or a name by letters such as alphabets, numbers, symbols, or the like may be assigned.

Further, in the above embodiment, the learning system 30 generates AI that decomposes a document into each item and AI that assigns a label according to content of a decomposed sentence. However, AI that decomposes sentences into a sentence, and assigns a label according to content of each decomposed sentence may be generated. This AI is generated by causing machine learning (for example, deep learning or a neural network) to be performed using data in which a document is divided in advance and assigned with a label as learning data (teaching data). Then, the sentences decomposition unit and the label assigning unit may decompose the sentences into a sentence and assign a label according to content of the decomposed sentence using AI that assigns a label according to content of the decomposed sentence.

REFERENCE SIGNS LIST

1 Summary creation system
2 Document DB
3 Information terminal
4 Server
10 Output unit
11 Input unit
20 Document storage unit
21 Similarity calculation unit
22 Cluster classification unit
23 Index calculation unit
24 Document selection unit
25 Sentences decomposition unit
26 Label assigning unit
27 Summary element extraction unit
28 Summary creation unit
29 Display data generation unit
30 Learning system
N Communication network

The invention claimed is:

1. A summary creation method for creating a summary from one sentences by a computer, the method comprising:
calculating a similarity between content of at least two documents from among a plurality of documents;
generating a network that includes each of the plurality of documents based on the calculated similarity;
classifying documents from the plurality of documents having the calculated similarity into a cluster;
decomposing sentences extracted from the classified documents included in the cluster using a centrality index;
assigning a label according to content of the decomposed sentence;
extracting a sentence from the cluster to which a label is assigned as a summary element; and
creating a summary based on the summary element.

2. The summary creation method according to claim 1, wherein the assigning includes AI assigning a label according to content of the decomposed sentence.

3. The summary creation method according to claim 1, wherein the decomposing includes AI decomposing sentences, and the assigning includes the AI assigning a label according to content of the decomposed sentence.

4. The summary creation method according to claim 1, wherein the creating includes creating the summary in one sentence.

5. A summary creation system that creates a summary from one sentences comprising:
   a calculator that calculates a similarity between content of one document from among a plurality of documents and another document from among the plurality of documents;
   a generator that generates a network that includes each of the plurality of documents based on the calculated similarity;
   a classifier that classifies documents from the plurality of documents having the calculated similarity into a cluster;
   a sentences decomposer that decomposes sentences extracted from sentences from documents included in the cluster using a centrality index;
   a label assigner that assigns a label according to content of the decomposed sentence;
   a summary element extractor that extracts a sentence to which a label is assigned as a summary element; and
   a summary creator that creates a summary based on the summary element.

6. A program that causes a computer to execute creation of a summary from one sentences, the program causing a computer to execute operations that include:
   calculating a similarity between content of one document from among a plurality of documents and another document from among the plurality of documents;
   generating a network that includes each of the plurality of documents based on the calculated similarity;
   classifying documents from the plurality of documents having the calculated similarity into a cluster;
   decomposing sentences extracted from sentences from documents included in the cluster using a centrality index;
   assigning a label according to content of the decomposed sentence;
   extracting a sentence to which a label is assigned as a summary element; and
   creating a summary based on the summary element.

7. The summary creation program according to claim 6, wherein the assigning includes AI that learns to assign a label according to content of a sentence assigns assigning the label according to the content of the decomposed sentence.

8. The summary creation program according to claim 6, wherein the decomposing includes AI decomposing sentences, and the assigning includes the AI assigning a label according to content of each of the decomposed sentence.

9. The summary creation program according to claim 6, wherein the creating includes creating the summary in one sentence.

* * * * *

UNITED STATES PATENT AND TRADEMARK OFFICE
CERTIFICATE OF CORRECTION

| | |
|---|---|
| PATENT NO. | : 11,816,421 B2 |
| APPLICATION NO. | : 17/595154 |
| DATED | : November 14, 2023 |
| INVENTOR(S) | : Yamasaki et al. |

It is certified that error appears in the above-identified patent and that said Letters Patent is hereby corrected as shown below:

In the Drawings

Delete Fig. 4 and insert the attached drawing sheet.

Signed and Sealed this
Twenty-second Day of April, 2025

Coke Morgan Stewart
*Acting Director of the United States Patent and Trademark Office*